(12) United States Patent
Filippi et al.

(10) Patent No.: US 7,780,925 B2
(45) Date of Patent: Aug. 24, 2010

(54) FIXED-BED CATALYTIC REACTOR

(75) Inventors: Ermanno Filippi, Castagnola (CH);
Enrico Rizzi, Casnate con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 551 days.

(21) Appl. No.: 11/572,403

(22) PCT Filed: Jul. 22, 2005

(86) PCT No.: PCT/EP2005/008020

§ 371 (c)(1),
(2), (4) Date: Jan. 19, 2007

(87) PCT Pub. No.: WO2006/010565

PCT Pub. Date: Feb. 2, 2006

(65) Prior Publication Data

US 2008/0008633 A1    Jan. 10, 2008

(30) Foreign Application Priority Data

Jul. 29, 2004   (EP) .................................. 04017905

(51) Int. Cl.
*B01J 8/04* (2006.01)
*B01J 10/00* (2006.01)

(52) U.S. Cl. .................. 422/192; 422/190; 422/191; 422/193; 422/195; 422/218

(58) Field of Classification Search ................ 422/190, 422/191, 192, 193, 195, 218
See application file for complete search history.

(56) References Cited

U.S. PATENT DOCUMENTS

| | | |
|---|---|---|
| 4,769,220 A | 9/1988 | Zardi |
| 6,946,494 B2 | 9/2005 | Filippi et al. |
| 7,087,205 B2 | 8/2006 | Filippi et al. |

FOREIGN PATENT DOCUMENTS

| | | |
|---|---|---|
| DE | 100 31 347 A1 | 1/2001 |
| EP | 0 314 550 A1 | 5/1989 |
| EP | 0314550 * | 5/1989 |

(Continued)

OTHER PUBLICATIONS

Machine translation of EP0314550.*

*Primary Examiner*—Walter D Griffin
*Assistant Examiner*—Lessanework Seifu
(74) *Attorney, Agent, or Firm*—Akerman Senterfitt

(57) ABSTRACT

A radial chemical reactor (10, 110, 210, 310) for catalytic reactions comprising: a substantially cylindrical shell (12), a first catalytic bed (18) having a substantially ring shaped cross-section, coaxially supported in said shell (12) and having a reagent gases inlet side (20) and a reaction mixture outlet side (21); a plurality of heat exchangers (22) supported and distributed in a substantially ring-shaped respective portion of said first catalytic bed (18); at least one second catalytic bed (28) with a substantially ring-shaped cross-section, supported in said shell (12) coaxially to said first bed (18) and at a predetermined distance from said first bed, said second catalytic bed (28) having a reaction mixture inlet side (30) and a reaction gaseous products outlet side (31); a plurality of heat exchangers (32) supported and distributed in a substantially ring-shaped respective portion of said second catalytic bed (28).

7 Claims, 6 Drawing Sheets

FOREIGN PATENT DOCUMENTS

| WO | WO 90/09234 | 8/1990 |
| WO | WO 99/44939 | 9/1999 |
| WO | WO 2004/067163 A1 | 8/2004 |
| WO | WO 2004/101135 A1 | 11/2004 |
| WO | WO 2005/063375 A1 | 7/2005 |

* cited by examiner

FIXED-BED CATALYTIC REACTOR

FIELD OF APPLICATION

In its more general aspect, the present invention relates to a radial chemical reactor for heterogeneous catalytic reactions of the type comprising a substantially cylindrical shell, with a vertical axis, closed at opposite ends by respective covers, a catalytic bed, supported in said shell, and a plurality of heat exchangers arranged in said catalytic bed.

More in particular this invention relates to a reactor of the aforesaid type, structured to permit the gaseous reagents and the reaction products to flow across the catalytic bed in a mainly radial direction, in relation to the shell axis of said reactor. For this reason, in the following description and claims, this reactor will be referred to as a radial reactor, this term including both the purely radial reactors as well as the so-called axial-radial reactors.

PRIOR ART

As is known, in the field of heterogeneous catalytic reactions for the industrial synthesis of chemical products such as for example ammonia, methanol, formaldehyde or styrene, it is more and more felt the requirement of increasing production capacity and conversion yield, and at the same time the requirement of reducing energy consumption as well as installation, control and maintenance costs.

To this end, in prior art so-called pseudo-isothermal chemical reactors have been proposed, wherein the reaction temperature is controlled within a limited range of values around a pre-determined optimal value.

Although these are advantageous for many aspects, none of the reactors according to the prior art is able to satisfy the aforesaid requirements simultaneously.

In fact, while, on one hand, it is essential that reagents and products remain inside the reactor, or rather in the reaction zone (catalytic bed) thereof, for a sufficient period to permit reagent to react as well as permitting the mixture of reagents and products to perform heat exchange with an operating heat exchange fluid, on the other, the gaseous phase flow across said reaction zone (catalytic bed) must not be subject to excessive pressure drop, nor must require high energy consumption and/or complex and expensive structures for its implementation.

Therefore the result is that when high production capacity and conversion yield are required, in the prior art pseudo-isothermal reactors, and in particular those in which the reaction zone is defined within a radially crossed catalytic bed, the height development increases considerably, with a ratio between shell height and diameter equal to ten and more, as for example occurs in the ammonia synthesis.

It is precisely due to the considerable height of the catalytic bed that it occurs that the gaseous reagents, once they are distributed along the inlet wall of the said bed, do not possess sufficient speed to flow across said catalytic bed.

Said reduced crossing speed has a negative influence on the heat exchange coefficient between the reagents and the heat exchangers. For these reasons, in these reactors it has proved impossible to obtain optimal control of the pseudo-isothermal level of the reaction.

SUMMARY OF THE INVENTION

The technical problem underlying the present invention is that of providing a chemical reactor of the aforesaid type having structural and functional characteristics such as to allow high production capacity and conversion yield and, at the same time, to be simple to carry out, permitting low energy consumption and requiring low installation, operating and maintenance costs in order to overcome the drawbacks of the prior art described above.

The aforesaid technical problem is solved by a radial chemical reactor for catalytic reactions comprising:

a substantially cylindrical shell closed at the opposite ends by respective covers;

a first catalytic bed with a substantially ring-shaped cross-section, co-axially supported in said shell and having a reagent gases inlet side and a reaction mixture outlet side;

a plurality of heat exchangers, supported and distributed in a substantially ring-shaped respective portion of said first catalytic bed;

at least one second catalytic bed with a substantially ring-shaped cross-section, supported in said shell co-axially to said first bed and at a predetermined distance from said first bed, said second catalytic bed having a reaction mixture inlet side and a reaction gaseous products outlet side;

a plurality of heat exchangers supported and distributed in a substantially ring-shaped respective portion of said second catalytic bed;

means for distributing the reagent gases over all said inlet side of said first catalytic bed;

means for putting in fluid communication the outlet side of said first catalytic bed with the inlet side of said second catalytic bed; and means for distributing the reaction mixture over all said inlet side of said second catalytic bed.

Further characteristics and advantages of the invention will become clearer from the detailed description of an embodiment of a chemical reactor according to the invention, given hereafter with reference to the attached drawings, for indicative and non-limiting purposes.

DETAILED DESCRIPTION OF A PREFERRED EMBODIMENT

Figure 1:
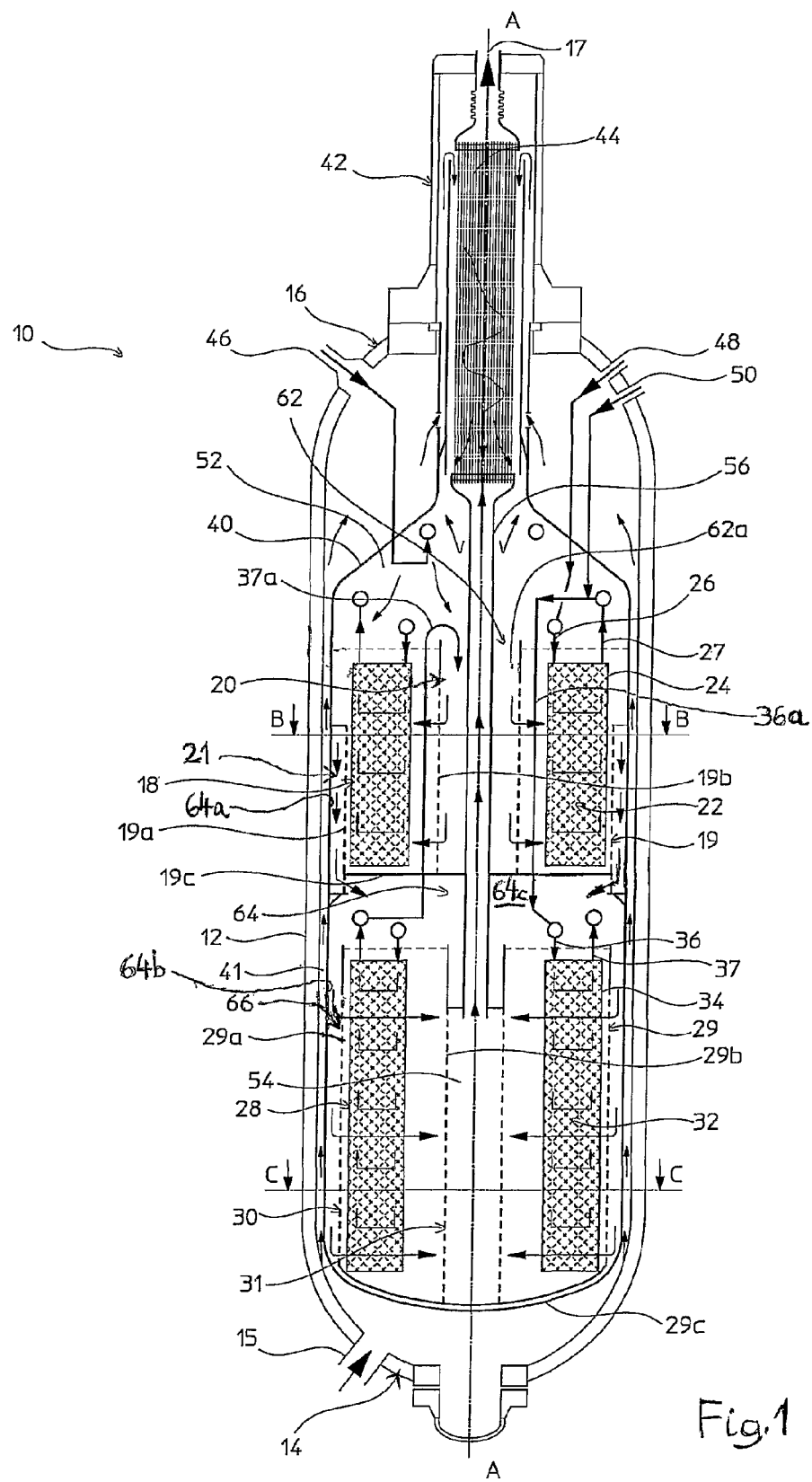
FIG. 1 shows a schematic view of a longitudinal cross-section of a chemical reactor according to the invention.
Figure 1A:
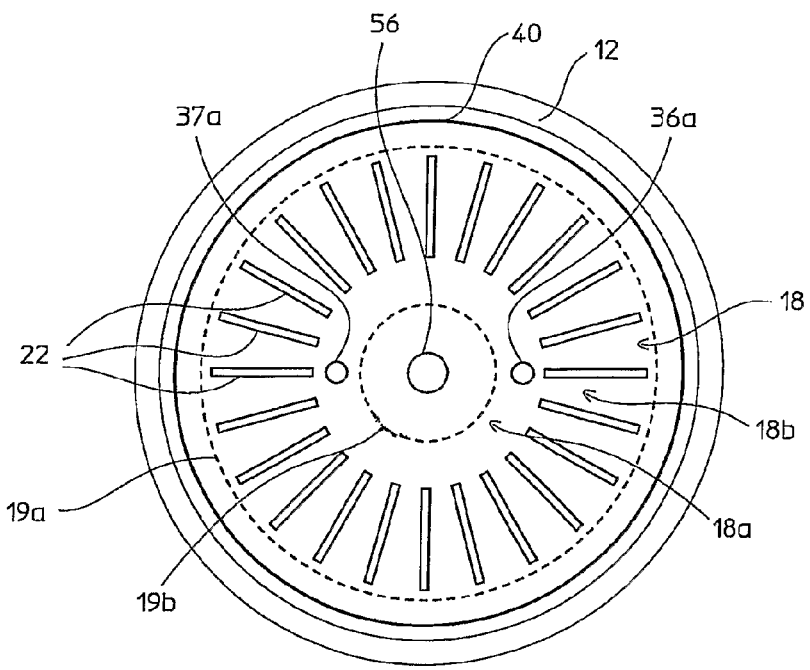
FIG. 1a shows a schematic view of a transversal cross-section of the chemical reactor of FIG. 1, taken according to the plane traced with B-B in FIG. 1.
Figure 1B:
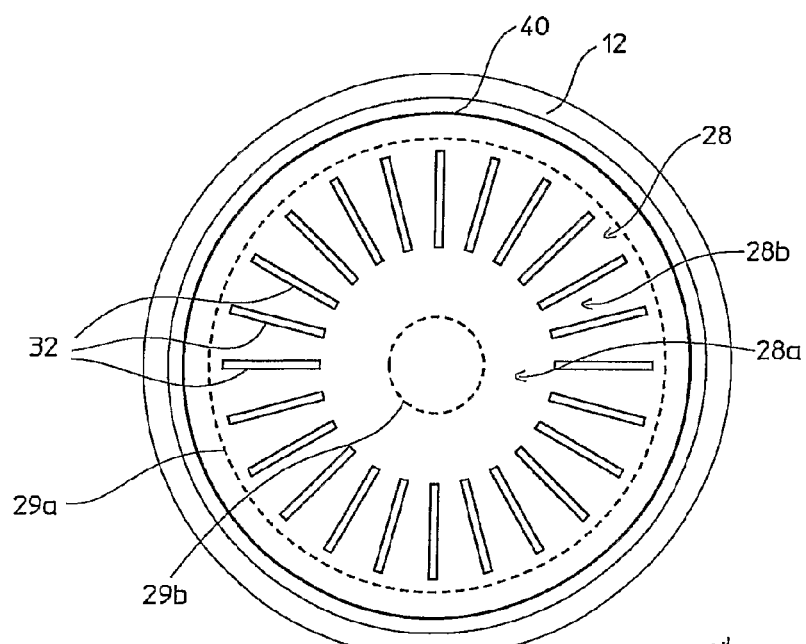
FIG. 1b shows a schematic view of a transversal cross-section of the chemical reactor of FIG. 1, taken according to the plane traced with C-C in FIG. 1.

FIGS. 1, 1a and 1b show a chemical reactor for catalytic reactions according to the present invention and globally indicated with 10.

The chemical reactor 10 is of radial type and more precisely of the so-called axial-radial type, and comprise a substantially cylindrical shell 12, having a vertical axis A-A and being closed at the opposite ends by respective covers, lower cover 14 and upper cover 16, and a first catalytic bed 18 having a substantially ring-shaped cross-section. The first catalytic bed 18 is co-axially supported, in a per se known manner, in said shell 12 and has an inlet side 20 of the reagent gases and a reaction mixture outlet side 21, said sides being substantially co-axial and concentric: the bed 18 is destined to be crossed with a substantially radial motion, and more precisely with an axial-radial motion, by the reagent gases and by the reaction products.

In particular, the first catalytic bed 18 is defined along the direction parallel to the A-A axis by walls 19a and 19b, respectively external and internal walls, of a basket 19 having a substantially ring-shaped cylindrical configuration; said walls 19a and 19b are perforated, or in any case are permeable to the gas, in order to permit the radial flow of the reagents through the catalytic bed 18. Said basket 19 is also closed on the underside by a bottom 19c.

A plurality of heat exchangers 22 is placed in the catalytic bed 18. More precisely, the heat exchangers 22 are supported and distributed in a substantially ring-shaped respective portion of the said first catalytic bed 18. Said heat exchangers 22 are plate-shaped, rectangular, box-like, preferably positioned in a radial arrangement with long sides 24 parallel to the A-A axis of the shell 12.

Non-restrictively, said heat exchangers 22 can be arranged in more than one row, concentric and coaxial to said shell 12, not illustrated in the figures.

Said heat exchangers 22 comprise an inlet connection 26 and an outlet connection 27 for a operating heat exchange fluid.

Advantageously, according to one aspect of the present invention, in the example shown in FIG. 1, the chemical reactor 10 comprises a second catalytic bed 28, having a substantially ring-shaped cross-section. Alternatively, further catalytic beds, not illustrated in the figures, can be provided.

The second catalytic bed 28 is supported, in a per se known manner, in said shell 12, positioned coaxially to the first catalytic bed 18 and at a predetermined distance from said bed 18. The second catalytic bed 28 has a reaction mixture inlet side 30 and a reaction gaseous products outlet side 31, said sides being substantially co-axial and concentric. The second bed 28 is destined to be crossed with a substantially radial motion, and more precisely with an axial-radial motion, by the reagent gases and by the reaction products.

The second catalytic bed 28 is defined along the direction parallel to the A-A axis by walls 29a and 29b, respectively external and internal walls, of a basket 29 having a substantially ring-shaped cylindrical configuration; said walls 29a and 29b are perforated, or in any case are permeable to the gas, in order to permit the radial flow of the reagents through the catalytic bed 28. Said basket 29 is also closed on the underside by a bottom 29c.

A plurality of heat exchangers 32 is placed in the catalytic bed 28. More precisely, the heat exchangers 32 are supported and distributed in a substantially ring-shaped respective portion of the said second catalytic bed 28. Also said heat exchangers 32 are plate-shaped, rectangular, box-like, preferably positioned in a radial arrangement with long sides 34 parallel to the A-A axis of the shell 12.

Non-restrictively, said heat exchangers 32 can be arranged in more than one row, concentric and coaxial to said shell 12, not illustrated in the figures.

Said heat exchangers 32 comprise an inlet connection 36 and an outlet connection 37 for a operating heat exchange fluid.

At least one of said plurality of heat exchangers 22, 32 of said catalytic beds 18 and 28 is in fluid communication with the exterior; in this particular case, this refers to heat exchangers 22.

According to one characteristic of the present invention, said plurality of heat exchangers 22 and 32 extend in the first 18 and second catalytic beds 28 respectively, for only a portion of the beds to define, within said reaction spaces, a pseudo-isothermal zone and an adiabatic zone.

Preferably, the heat exchangers 22 and 32 extend, longitudinally, for almost the total height of the respective catalytic beds 18 and 28, and, radially, for a portion advantageously ranging between 55% and 95% of the width, i.e. the thickness, of the respective catalytic beds 18 and 28. Preferably, in the first catalytic bed 18 this portion advantageously ranges between 65% and 80% of the thickness, while in the second catalytic bed 28 this portion advantageously ranges between 60% and 75% of the thickness.

More precisely said plurality of heat exchangers 22 extends in a portion of the first catalytic bed 18 from the outlet side 21 of the catalytic bed 18 itself.

On the other hand, said plurality of heat exchangers 32 extends in a portion of the second catalytic bed 28 from the inlet side 30 of the catalytic bed 28 itself.

In the example shown in FIG. 1, the pluralities of heat exchangers 22 and 32 are both positioned in proximity to shell 12.

They are also provided:

means 62 for distributing the reagent gases over all said inlet side 20 of said first catalyst bed 18;

means 64 for putting in fluid communication the outlet side 21 of said first catalytic bed 18 with the inlet side 30 of said second catalytic bed 28, and means 66 for distributing the reaction mixture over all said inlet side 30 of said second catalytic bed 28.

It should be noted that, in the example shown in FIG. 1, the shell 12 comprises a cartridge 40, that is cylindrical and coaxial with the shell 12 itself and in which are contained the first 18 and the second catalytic bed 28. An interspace 41 is defined between cartridge 40 and shell 12.

Moreover, always in the example of FIG. 1, the reactor 10 has an upper portion 42 configured in bottle-neck form; more precisely, the upper cover 16 has a diameter that is substantially smaller than that of the shell 12, and is connected to said upper portion 42, substantially cylindrical. A tube bundle heat exchanger 44 is provided in said upper portion 42.

A collector chamber 52 for the reagent gases is provided upstream of the first catalytic bed 18, in the cartridge 40.

A collector chamber 54 for the reaction gaseous products is provided downstream of the second catalytic bed 28, internally in relation to the internal wall 29b of the basket 29. A connector duct 56 is also provided between said collector chamber 54 and the tube bundle heat exchanger 44 in the upper portion 42.

A ring-shaped duct 62a is defined between the internal wall 19b of said basket 19 and said duct 56. A ring-shaped interspace 64a is defined between said cartridge 40 and the external wall 19a of said basket 19.

A ring-shaped interspace 64b is defined between said cartridge 40 and the external wall 29a of said basket 29.

The means 62 for distributing the reagent gases over all said inlet side 20 of said first catalytic bed 18 comprise the external wall 19a and/or the internal wall 19b of the basket 19. Said walls 19a and 19b have drillings distributed in an appropriate manner to permit a substantially uniform distribution of the reagent gases.

The means 64 for putting in fluid communication the outlet side 21 of said first catalytic bed 18 with the inlet side 30 of said second catalytic bed 28 comprise the interspaces 64a and 64b, and an intermediate collector chamber 64c for the reaction gaseous mixture provided between said first and said second catalytic bed.

The means 66 for distributing the reaction mixture over all said inlet side 30 of said second catalytic bed 28 comprise the external wall 29a and/or the internal wall 29b of the basket 29. Said walls 29a and 29b have drillings distributed in an appropriate manner to permit a substantially uniform distribution of the reaction mixture.

The lower cover 14 is equipped with an opening 15 for the introduction of the reagent gases, while the upper cover 16, and more precisely the upper portion 42, is equipped with an opening 17 for reaction products discharge. Furthermore, at an upper end of the shell 12, before the upper portion 42 of reactor 10, they are provided an opening 46 for the introduction of fresh reagent gases upstream of the first catalytic bed 18, an opening 48 for operating heat exchange fluid supply to the first catalytic bed 18 and an opening 50 for operating heat exchange fluid supply upstream of the second catalytic bed 28.

The operation of the reactor 10 of the invention is the following.

The supply reagent gases enters the reactor 10 through opening 15 of the lower cover 14 and flows upwards in the interspace 41 present between the shell 12 and the cartridge 40, until it reaches the tube bundle heat exchanger 44.

The tube bundle heat exchanger 44 pre-heats the supply reagent gases. At the outlet from the tube bundle heat exchangers 44, the supply reagent gases are mixed, in the collector chamber 52 of reagent gases upstream of the first catalytic bed 18, with a further reagent gases flow, coming from the exit connection 37 of the heat exchangers 32 of the second catalytic bed 28. More precisely, said further reagent gases flow is supplied to reactor 10 through the opening 48, passes through the plate-type heat exchangers 22 and 32, as operating heat exchange fluid (as will be described in more detail further on), and is supplied to the collector chamber 52 where it mixes with the reagent gases flow, that has been appropriately pre-heated, coming from the tube bundle heat exchanger 44. The temperature of this supply reagent gases mixture, that enters the first catalytic bed 18, is controlled again by means of a flow of by-pass fresh reagent gases, supplied into the collector chamber 52 through the opening 46.

The mixture of reagent gases obtained in the collector chamber 52 is distributed over all inlet side 20 of the first catalytic bed 18, crosses it radially and exits from the outlet side 21.

As shown in FIG. 1a, the appropriate distribution of the heat exchangers 22 provide for the definition of two concentric and co-axial ring-shaped zones in the first catalytic bed 18: a first adiabatic zone 18a, free of any heat exchangers and therefore without removal of reaction heat, and a second pseudo-isothermal zone 18b, where the heat exchangers 22 are extended and therefore where heat is removed by the operating heat exchange fluid flowing in the exchangers 22.

This arrangement permits the reagent gases that cross the catalytic bed 18 to attain and maintain a temperature that corresponds with the reaction temperature at the maximum conversion level and therefore permits to operate with high reagents conversion yields.

After the reagent gases and the reaction products leave the first bed 18, they enter the second bed 28 in the form of a reaction mixture with a flow directed towards the interior of the reactor 10.

As shown in FIG. 1b, the second catalytic bed 28 is also divided into two zones, a first pseudo-isothermal zone 28b, in which the heat exchangers 32 are extended, and a second adiabatic zone 28a.

After the gases obtained leave the second bed 28, they are collected in the collector chamber 54 of the reaction gaseous products, cross the connection duct 56 between the collector chamber 54 and the tube bundle heat exchanger 44 (where, as described previously, the supply reagent gases are pre-heated) and exit from the reactor 10 through the opening 17.

As described above, a portion of the reagent gases is supplied into the heat exchangers 22 and 32 as operating heat exchanger fluid.

In particular, said operating heat exchange fluid enters the plates of heat exchanger 22 of the first catalytic bed 18 through the opening 26.

The operating fluid flow in the heat exchangers plates 22 is towards the exterior of the reactor, and therefore is in co-current with the reagent gases flowing in the catalytic bed 18. Advantageously, said co-current flow prevents excessive heat removal from the catalytic bed that results in reduction of the bed's efficiency.

The operating fluid exits from the connection 27 and is supplied into the connection 36 of the plates of the second catalytic bed 28 through a duct 36a. The temperature of this cooling operating fluid is controlled thanks to the supply of fresh operating heat exchange fluid to the duct 36a coming from the opening 50.

The operating fluid flow in the plates of the heat exchanger 32 is towards the exterior of the reactor, and therefore is in counter-current with the reagent gases flowing in catalytic bed 28. Advantageously, since in the second catalytic bed 28 this operating fluid flowing in the plates is already partially pre-heated, the flow in counter-current makes a further heat removal easier without the danger of undercooling the second bed 28. The operating fluid exits from the connection 37 and is supplied, through a duct 37a, to the collector chamber 52 upstream of the first catalytic bed 18 as described previously.

Figure 2:
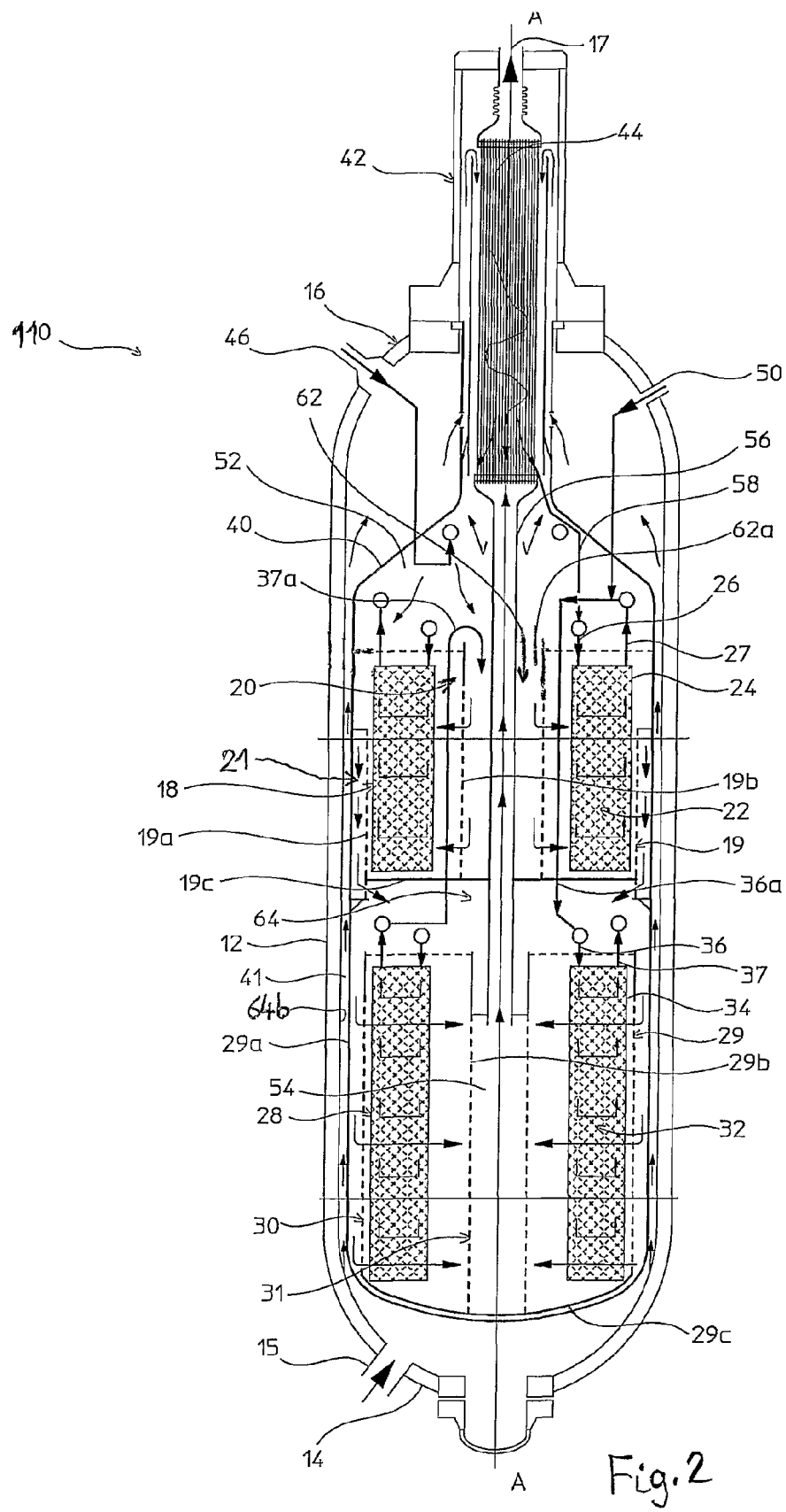
FIG. 2 shows a schematic view of a longitudinal cross-section of a first variant embodiment of the invention.

FIG. 2 shows a first variant embodiment of a chemical reactor according to the invention, globally indicated with 110 and structurally similar to the reactor 10. In said FIG. 2, the reactor 110 components similar to those of the reactor 10 have the same reference numbers and for the sake of brevity are not described in detail.

It can be seen that, unlike the reactor 10, the opening 48 for supplying reagent gases directly to the plates as heat exchange fluid is not provided.

The operation of the reactor 110 according to the invention is the following.

The supply reagent gases enter the reactor 110 from the opening 15 of the lower cover 14 and flow upwards in the interspace 41 present between the shell 12 and the cartridge 40.

The tube bundle heat exchanger 44 pre-heats the supply reagent gases. At the outlet from the tube bundle heat exchangers 44, the supply reagent gases are sent through a duct 58 to the connection 26 of the plates of the first catalytic bed 18, as operating heat exchange fluid.

The operating fluid flow in the plates is towards the exterior of the reactor, and therefore in co-current with the reagent gases in the catalytic bed 18. The temperature of this cooling operating fluid is controlled thanks to the supply of operating fluid to the duct 36a through the opening 50.

The operating fluid exits from the connection 27 and enters the connection 36 of the plates of the second bed 28.

The operating fluid flow in the plates is towards the interior of the reactor, and therefore in counter-current with the reagent gases in the catalytic bed 28. After leaving the plates through the connection 37, the operating fluid is taken back to the collector chamber 52, upstream of the first bed 18, and from there it passes through the catalytic beds 18 and 28 as reagent gas, in a manner similar to that described for the reactor 10.

Figure 3:
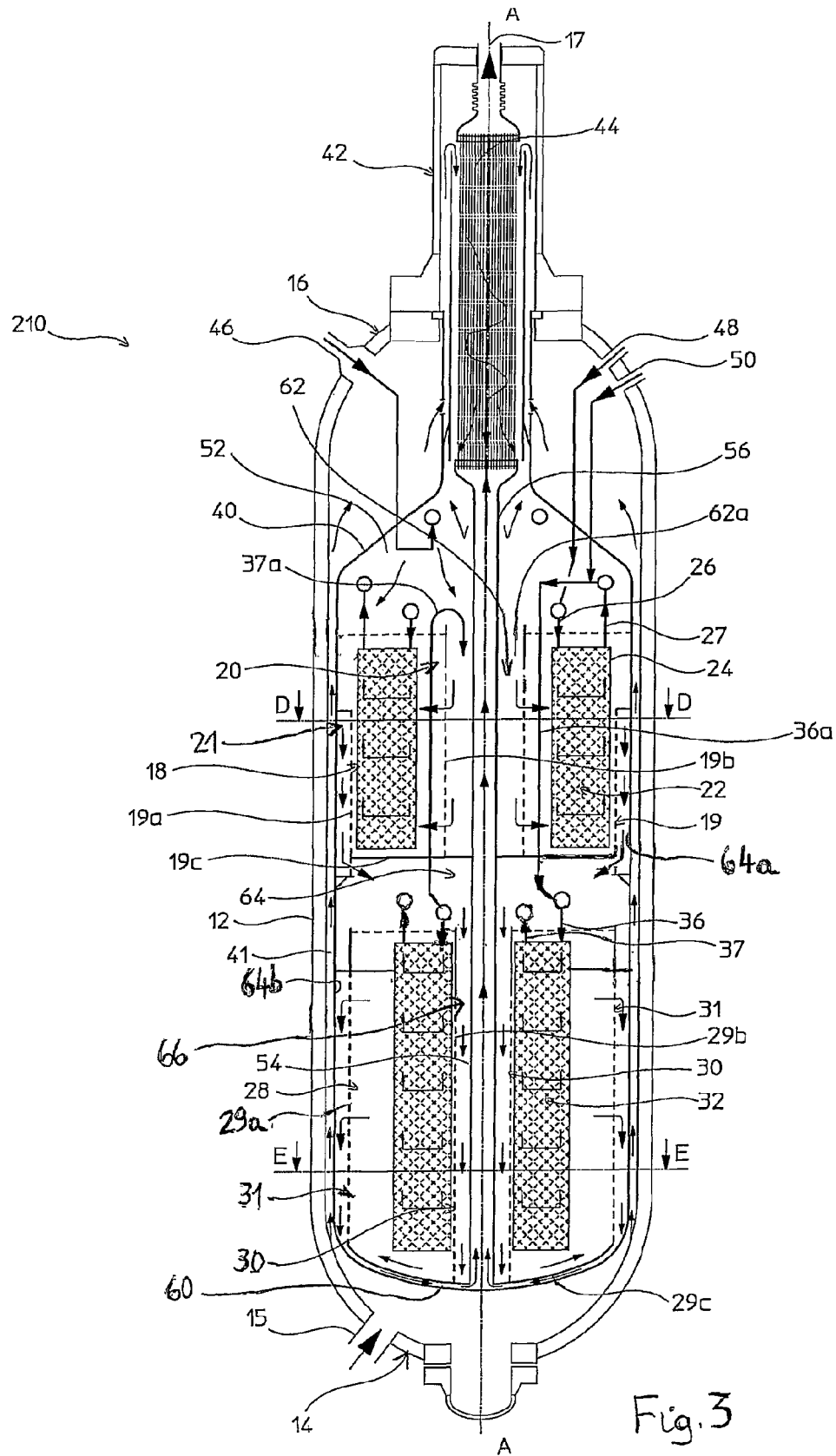
FIG. 3 shows a schematic view of a longitudinal cross-section of a second variant embodiment of the invention.
Figure 3A:
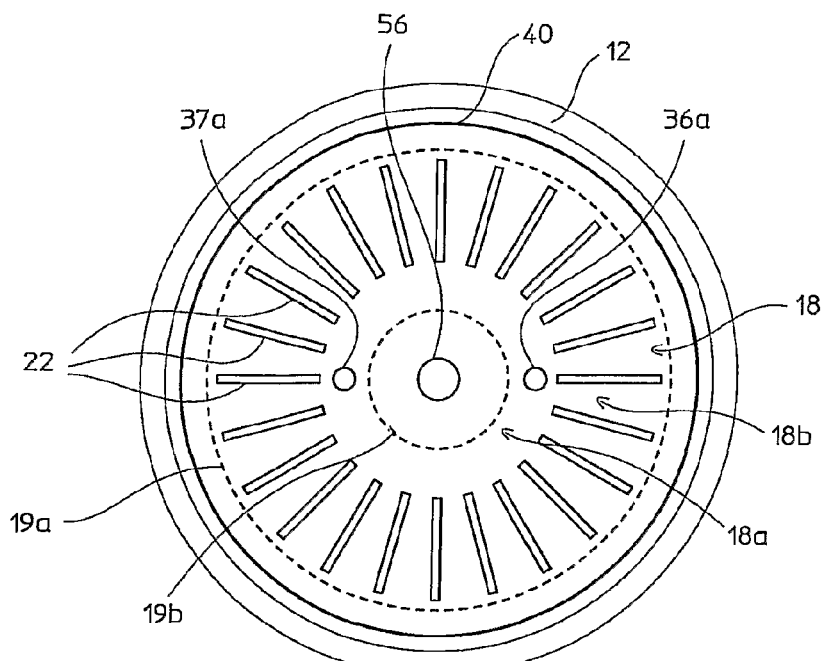
FIG. 3a shows a schematic view of a transversal cross-section of the chemical reactor of FIG. 3, taken according to the plane traced with D-D in FIG. 3.
Figure 3B:
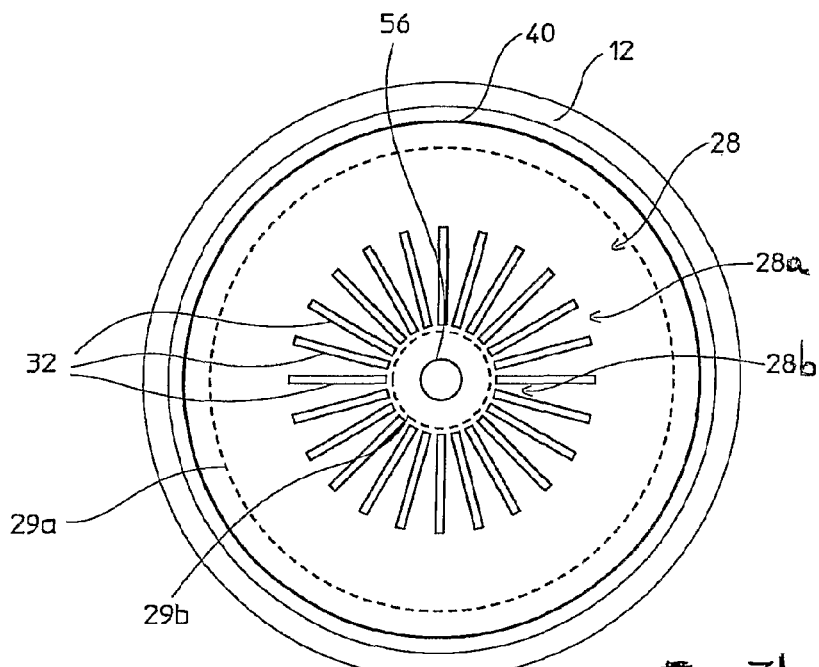
FIG. 3b shows a schematic view of a transversal cross-section of the chemical reactor of FIG. 3, taken according to the plane traced with E-E in FIG. 3.

The FIGS. 3, 3a, and 3b show a second variant embodiment of a chemical reactor according to the invention, globally indicated with 210. In these figures, the components of the reactor 210 that are similar to those of the reactor 10 have the same reference numbers and for the sake of brevity are not described in detail.

Like the reactor 10, pluralities of heat exchangers 22 and 32 are provided, extending in the respective reaction spaces of said first 18 and said second 28 catalytic beds only for a portion of the beds themselves.

In this case, said plurality of heat exchangers 22 extends in a portion of the first catalytic bed 18 from the outlet side 21 of the catalytic bed 18 itself.

Said plurality of heat exchangers 32 extends in a portion of the second catalytic bed 28 from the inlet side 30 of the catalytic bed 28 itself.

In the example shown in FIG. 3, the plurality of heat exchangers 22 extends in a portion of the catalytic bed 18 that is positioned in the proximity of shell 12, while the plurality of heat exchangers 32 extends in a portion of the catalytic bed 28 that is positioned in proximity of the A-A axis of the shell 12.

As is shown in FIG. 3a, the first catalytic bed 18 is divided into two zones, a first adiabatic zone 18a and a second pseudo-isothermal zone 18b, where the exchangers 22 are extended.

As is shown in FIG. 3b, the second catalytic bed 28 is also divided into two zones, a first pseudo-isothermal zone 28b, where the exchangers 22 are extended, and a second adiabatic zone 28a.

The operation of the reactor 210 according to the invention is identical to the operation of the reactor 10 shown in FIG. 1 with a single exception, in that, after leaving the first catalytic bed 18, the reagent gases enter the second bed 28 with a flow directed towards the exterior of the reactor 210; after leaving the second bed 28, the reaction products obtained are collected in a collector interspace 60, in fluid communication with through a connecting duct 56.

Figure 4:
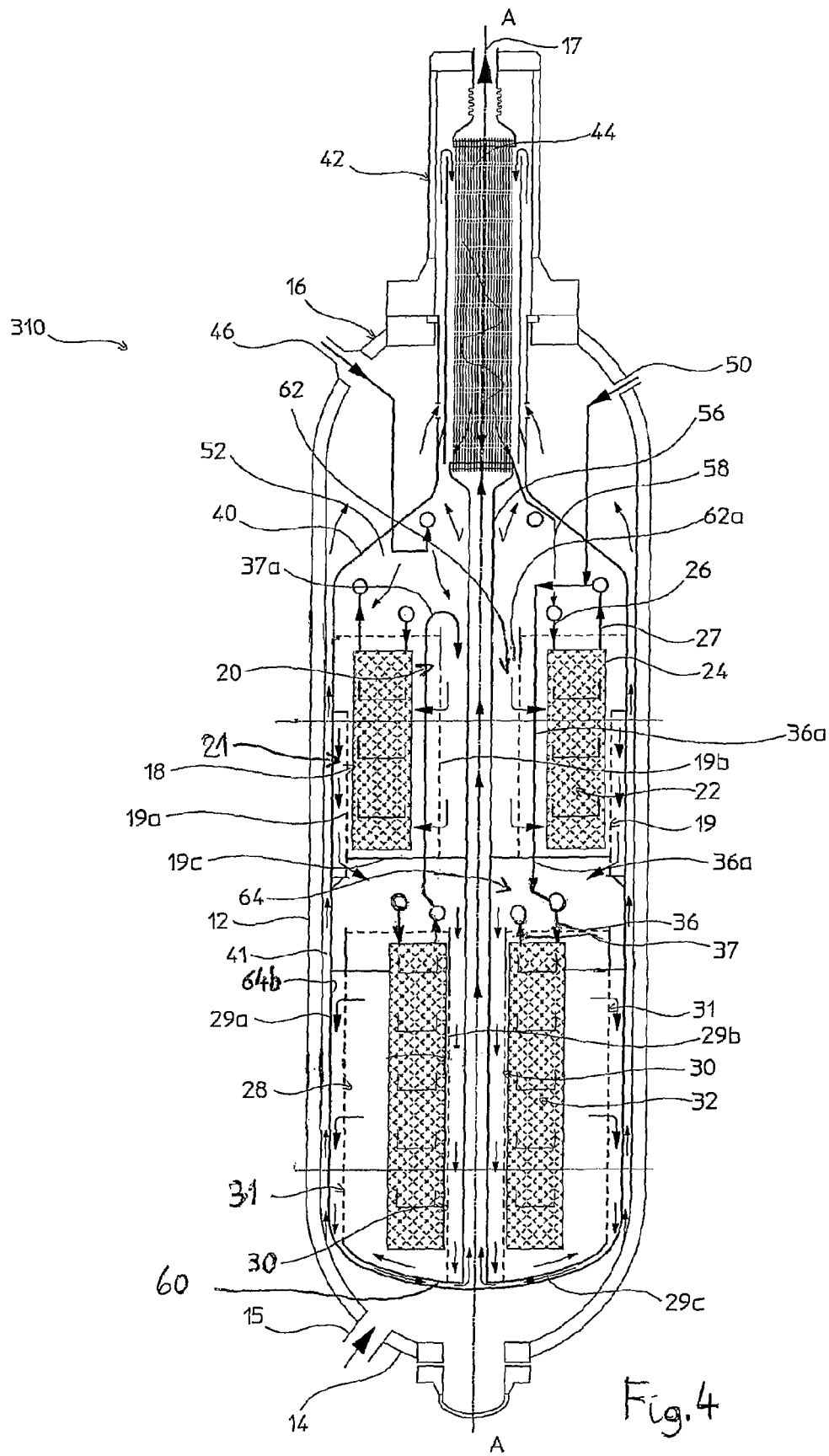
FIG. 4 shows a schematic view of a longitudinal cross-section of a third variant embodiment of the invention.

FIG. 4 shows a third variant embodiment of a chemical reactor according to the invention, globally indicated with 310 and structurally similar to the reactor 210 of FIG. 3. In said FIG. 4, the reactor 310 components similar to those of the reactor 210 have the same reference numbers and for the sake of brevity are not described in detail.

It can be seen that, unlike the reactor 210, an opening 48 for supplying reagent gases directly to the plates is not provided.

The operation of the reactor 310 according to the invention is the following.

The supply reagent gases enter the reactor 310 through the opening 15 of the lower cover 14 and flow upwards in the interspace 41 present between the shell 12 and the cartridge 40.

The tube bundle heat exchanger 44 pre-heats the supply reagent gases. At the outlet from the tube bundle heat exchanger 44, the supply reagent gases are sent through a duct 58 to the connection 26 of the plates of the heat exchanger 22 of the first catalytic bed 18, as operating heat exchanger fluid.

The operating fluid path in the plates of the heat exchangers 22 and 32 is identical to that described for the reactor 110, and is not described herein for the sake of brevity.

After leaving the plates through the connection 37, the operating fluid is supplied in the collector chamber 52, upstream of the first bed 18, as pre-heated reagent gas.

The temperature of this gas, entering the first catalytic bed 18, is controlled even further by means of a flow of by-pass fresh reagent gases, supplied into the collector chamber 52 through the opening 46.

The path of the reaction mixture through the catalytic beds and from there towards the exterior of the reactor 310 is identical to that described for the reactor 210 and is not included herein for the sake of brevity.

The invention also refers to a catalytic synthesis process in a radial chemical reactor comprising:

a substantially cylindrical shell 12, closed at the opposite ends by respective covers 14 and 16;

a first catalytic bed 18 with a substantially ring-shaped cross-section, coaxially supported in said shell 12 and having a reagent gases inlet side 20 and a reaction mixture outlet side 21;

a plurality of heat exchangers 22 supported and distributed in a substantially ring-shaped respective portion of said first catalytic bed 18, an operating heat exchange fluid flowing in said heat exchangers 22;

at least a second catalytic bed 28 with a substantially ring-shaped cross-section, supported in said shell 12 coaxially to said first bed 18 and at a pre-determined distance from said first bed, said second catalytic bed 28 having a reaction mixture inlet side 30 and a reaction gaseous products outlet side 31;

a plurality of heat exchangers 32 supported and distributed in a substantially ring-shaped respective portion of said second catalytic bed 28, said operating heat exchange fluid flowing in said heat exchangers 32;

wherein they are provided:

a distribution stage of the reagent gases over all said inlet side 20 of said first catalytic bed 18, and a distribution stage of the reaction mixture over all said inlet side 30 of said second catalytic bed 28.

From the previous description it can clearly be deduced that a radial reactor according to the invention solves the technical problem and provides numerous advantages, the first of which being the fact that the reagent gases are distributed along inlet walls of respective catalytic beds having length that is shorter than the single catalytic bed of the prior art, and therefore the reagents have a greater speed of crossing of said catalytic beds. In this manner, it is obtained an improved control of the isothermal level of the reaction, this control being necessary for improving reactor reaction yields, for preventing catalyser damage and for preventing a deterioration of the reactor internal parts.

According to an advantageous embodiment of the present invention, it is possible to arrange a different number of heat exchangers in each catalytic bed, according to the amount of heat that is required to exchange.

In other words, for example, it is possible insert a larger number of heat exchangers where the reagents concentration is greater and the reaction occurs more rapidly, with the resulting need for greater heat exchange. On the other hand where the reagents concentration is less and the reaction proceeds in a blander manner, with consequent less need for heat exchange, fewer heat exchangers can be inserted. In this manner, the number of heat exchangers to be used can be reduced, resulting in cost savings.

It is advantageously possible to vary the catalytic beds length for the same reasons, in order to control the speed of the reagent gases crossing the beds and thus in order to control the reaction isothermal level.

Moreover, thanks to the present invention, advantageously the reagent gases very rapidly reach, in the adiabatic zone of the first catalytic bed, a reaction temperature that corresponds with the maximum conversion temperature; the gases are maintained at this temperature in the pseudo-isothermal zone of the first catalytic bed and in the following pseudo-isothermal zone of the second catalytic bed, and they complete their reaction in the adiabatic zone at the outlet from the second catalytic bed.

In relation to this aspect it was surprisingly discovered that the adiabatic zone at the outlet from the second catalytic bed does not cause a substantial loss in conversion yield compared to a corresponding pseudo-isothermal zone, while on the contrary considerable mechanical advantages can be obtained in terms of constructive simplicity and maintenance simplicity of the reactor, as well as simplicity in catalyser loading and unloading.

In fact, surprisingly and with great advantage, it is to note that, especially in the case of the so-called "bottle-neck" type reactors illustrated in the attached figures (that is, equipped with a closing upper cover having a diameter that is substantially smaller than the shell diameter, to furnish greater resistance against the high operating pressure), with the heat exchangers configuration provided by the invention, the assembly, the operation and the maintenance are unusually simple.

The particular radial extension of said plates according to the invention permits their introduction into the reactor through the man-holes provided in the shell or through the closing upper cover of the reactor (which, as was explained, has a smaller diameter than the shell diameter).

Moreover, because of the radial extension for only a portion of the catalytic bed, it becomes particularly easy to intervene on the plates of the two catalytic beds, as they can be easily handled, removed and replaced (when they have become worn for example), just as the catalyser loading and unloading stage results unusually simple.

Obviously, the man skilled in the art can bring numerous modifications and variants to the chemical reactor described above in order to satisfy specific and contingent requirements, all of these modifications and variants in any case being covered by the scope of protection of the invention, as defined by the following claims.

The invention claimed is:

1. A radial chemical reactor for catalytic reaction comprising:
    a substantially cylindrical shell, closed at opposite ends by respective covers;
    a first catalytic bed with a substantially ring-shaped cross-section, coaxially supported in said shell and having a reagent gases inlet side and a reaction mixture outlet side;
    a plurality of heat exchangers supported and distributed in a substantially ring-shaped respective portion of said first catalytic bed, an operating heat exchange fluid flowing in said heat exchangers;
    at least one second catalytic bed with a substantially ring-shaped cross-section, supported in said shell co-axially to said first bed and at a predetermined distance from said first bed, said second catalytic bed having a reaction mixture inlet side and a reaction gaseous products outlet side;
    a plurality of heat exchangers supported and distributed in a substantially ring-shaped respective portion of said second catalytic bed, said operating heat exchange fluid flowing in said heat exchangers;
    means for distributing the reagent gases over all said inlet side of said first catalytic bed;
    means for putting in fluid communication the outlet side of said first catalytic bed with the inlet side of said second catalytic bed; and
    means for distributing the reaction mixture over all said inlet side of said second catalytic bed,
    wherein said plurality of heat exchangers of said first catalytic bed extend in a portion of the first catalytic bed from the outlet side of the catalytic bed itself, and
    wherein said plurality of heat exchangers of said second catalytic bed extend in a portion of the second catalytic bed from the inlet side of the catalytic bed itself.

2. The radial chemical reactor according to claim 1, wherein said heat exchangers are plate-shaped, rectangular and box-shaped.

3. The radial chemical reactor according to claim 1, wherein at least one of said pluralities of heat exchangers of said catalytic beds is in fluid communication to the outside of the reactor.

4. The radial chemical reactor according to claim 1, wherein both said pluralities of heat exchangers are positioned in proximity to the shell.

5. The radial 1 chemical reactor according to claim 1, wherein said plurality of heat exchangers of said first catalytic bed are positioned in proximity to the shell and said plurality of heat exchangers of said second catalytic bed are positioned in proximity to the axis of the shell.

6. The radial chemical reactor according to claim 1, wherein the cover closing an upper end of the shell has a diameter substantially smaller than the diameter of the shell.

7. A catalytic synthesis process in a radial chemical reactor comprising:
    a substantially cylindrical shell, closed at opposite ends by respective covers;
    a first catalytic bed with a substantially ring-shaped configuration, co-axially supported in said shell and having a reagent gases inlet side and a reaction mixture outlet side;
    a plurality of heat exchangers supported and distributed in a substantially ring-shaped respective portion of said first catalytic bed, an operating heat exchange fluid flowing in said heat exchangers;
    at least one second catalytic bed with a substantially ring-shaped cross-section, supported in said shell co-axially to said first catalytic bed and at a predetermined distance from said first bed, said second catalytic bed having a reaction mixture inlet side and a reaction gaseous products outlet side;

a plurality of heat exchangers supported and distributed in a substantially ring-shaped respective portion of said second catalytic bed, said operating heat exchange fluid flowing in said heat exchangers;

means for distributing the reagent gases over all said inlet side of said first catalytic bed;

means for putting in fluid communication the outlet side of said first catalytic bed with the inlet side of said second catalytic bed;

means for distributing the reaction mixture over all said inlet side of said second catalytic bed, wherein the reagent gases are made to flow through a first adiabatic zone in the first catalytic bed, followed by a first pseudo-isothermal zone in the first catalytic bed, a second pseudo-isothermal zone in the second catalytic bed, and finally a second adiabatic zone in the second catalytic bed.

* * * * *